United States Patent

Marino et al.

[11] Patent Number: 5,079,641
[45] Date of Patent: Jan. 7, 1992

[54] ASSEMBLY FOR STATIC CONTROL AND DYNAMIC DAMPING OF AN OPTICAL ELEMENT

[75] Inventors: Philip F. Marino; Andrew J. Kalish; Phillip Vallone, all of Rochester, N.Y.

[73] Assignee: Eastman Kodak Company, Rochester, N.Y.

[21] Appl. No.: 583,639

[22] Filed: Sep. 17, 1990

[51] Int. Cl.$^5$ .............................................. G02B 26/08
[52] U.S. Cl. .................................. 359/224; 359/213; 359/196
[58] Field of Search ................ 350/321, 6.6, 486, 487, 350/6.1; 33/227; 310/323; 356/138; 250/347, 348, 353

[56] References Cited

U.S. PATENT DOCUMENTS 4,090,781  5/1978  Godot et al. ......................... 359/223
4,778,233  10/1988  Christenson et al. ............... 359/213

Primary Examiner—Loha Ben
Attorney, Agent, or Firm—Stephen C. Kaufman

[57] ABSTRACT

An assembly suitable for statically controlling and dynamically damping an optical element, for example, a secondary mirror. The assembly realizes a novel design technique which treats the problems of static control and dynamic damping of the optical element, as subsumed moments of one independent problem. The one interdependent problem may be solved by way of a single structural design, featuring a unique lever arm, which can provide overlapping functions responsive, at one and the same time, to both moments.

6 Claims, 1 Drawing Sheet und 5,079,641

ASSEMBLY FOR STATIC CONTROL AND DYNAMIC DAMPING OF AN OPTICAL ELEMENT

CROSS-REFERENCE TO RELATED APPLICATION

This application is related to U.S. Patent Application Ser. No. 07/574,171 filed Aug. 28, 1990, by Marino et al. The entire disclosure of this application is incorporated by reference herein. This application is copending and commonly assigned.

BACKGROUND OF THE INVENTION

Field of the Invention

This invention relates to an assembly suitable for statically controlling and dynamically damping an optical element.

INTRODUCTION TO THE INVENTION

Our work concerns the problems of statically controlling and dynamically damping an optical element. In particular, our optical element typically is part of an optical system, of the type shown in FIG. 1.

FIG. 1 shows an optical system 10. The optical system 10 comprises a support structure 12, and a primary mirror 14 positioned on the support structure 12. The optical system 10 also includes an optical element comprising a secondary mirror 16. The secondary mirror 16 may be connected to the support structure 12 by way of a set of conventional flexure struts 18.

SUMMARY OF THE INVENTION

Our work, in particular, concerns the problems of statically controlling and dynamically damping the FIG. 1 secondary mirror 16.

By statically controlling the FIG. 1 secondary mirror 16, we mean positioning the secondary mirror 16 in six degrees of freedom. It may be assumed, for our purposes, that once the secondary mirror 16 is positioned in six degrees of freedom, to known positional specifications, that it is to remain so positioned, for all time, independent of extraneous perturbations to the optical system 10.

By dynamically damping the FIG. 1 secondary mirror 16, we mean a capability for accommodating transient, spurious, and extraneous vibratory perturbations to the optical system 10, as well as accommodating known, predetermined perturbations to the optical system 10, to the end of minimizing the perturbations from upsetting the positioning of the secondary mirror 16, within a known time frame.

We have recognized that, heretofore, the problems of statically controlling and dynamically damping the FIG. 1 secondary mirror 16, have been understood as dual, or independent, problems. Accordingly, workers skilled in this art have developed independent approaches, techniques, and structural solutions, for independently accommodating the static control and dynamic damping of the secondary mirror 16.

We have theorized that one reason for this independence of approach may be the following. In order to realize static control, there is a design tendency to use structures in the optical system 10 that are rigid and stiff. It is thought that rigid and stiff structures best position the secondary mirror 16, and therefore provide a desired static control. In order to realize dynamic damping, on the other hand, there is a design tendency to use structures in the optical system 10 that are not rigid and stiff, and therefore can more readily control and dampen vibratory perturbations incurred by the optical system 10.

Putting these two design objectives together, it may have been thought that, since the two problems of static control and dynamic damping may require different, indeed, antagonistic structural solutions, it is preferred to continue to treat them as separate, independent problems.

We have recognized, however, that to treat and attempt to solve the two problems of static control and dynamic damping, independently, may lead to unnecessary optical system 10 design redundancies, and lead as well to possible losses in design efficiencies, while creating undue system response times to perturbations.

We have now discovered a novel design technique which treats the problems of static control and dynamic damping as subsumed moments of one interdependent problem. The one interdependent problem can be accommodated by a single structural design which provides overlapping functions. In this way, our novel design technique realizes important advantages over the prior art, including elimination of structural redundancies, and streamlined efficiencies.

The novel design technique may be realized in a novel assembly of the present invention, the novel assembly comprising:

a) an optical element;
b) a lever arm having a spring stiffness of at least 20 K pounds/inch, but less than 2 M pounds/inch;
c) a flexure means for connecting the lever arm to the optical element;
d) a static position actuator for positioning the lever arm, thereby positioning the optical element by way of the flexure means;
e) a passive damping assembly for applying damping forces to the lever arm, thereby, by way of the flexure means, dampening perturbations to the optical element.

BRIEF DESCRIPTION OF THE DRAWING

The invention is illustrated in the accompanying drawing, in which.

DETAILED DESCRIPTION OF THE INVENTION

Figure 1:
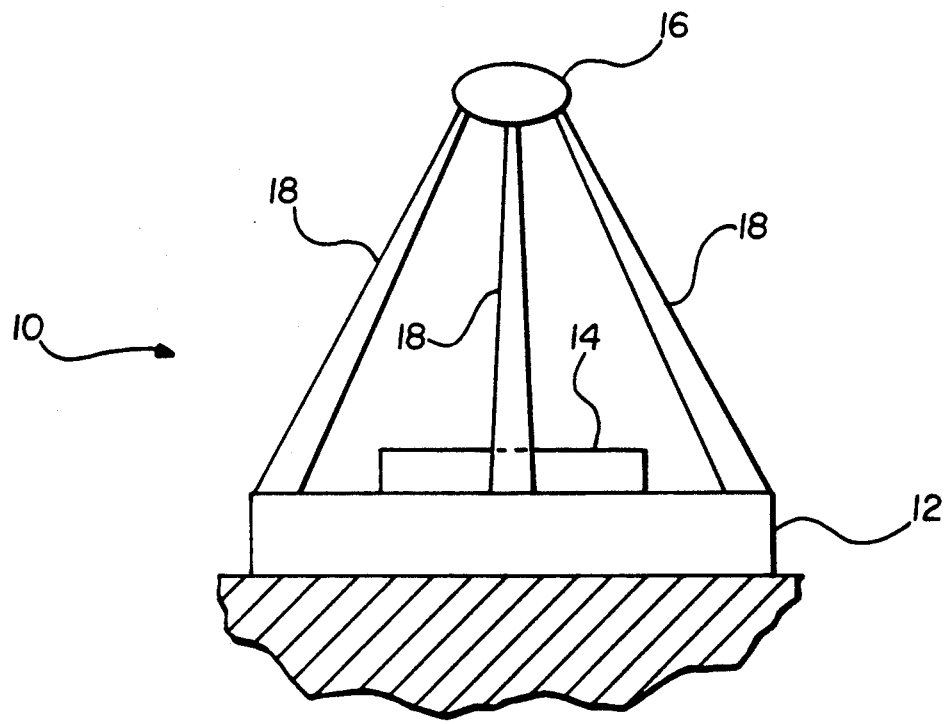
FIG. 1 shows an optical system that provides background information for the present invention.
Figure 2:
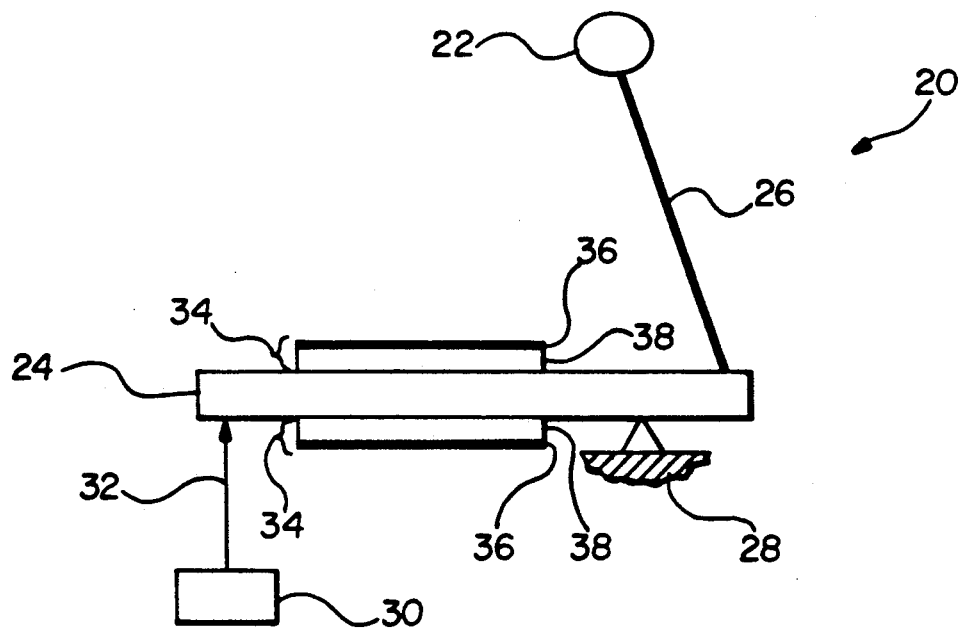
FIG. 2 shows a preferred assembly of the present invention.

Attention is now directed to FIG. 2, which shows a preferred, canonical assembly 20 of the present invention. In overview, the FIG. 2 assembly includes the following components.

An optical element comprising a secondary mirror 22 is connected to a lever arm 24, by way of a strut flexure 26. The lever arm 24, in turn, is supported and balanced, in a conventional manner, by way of a fulcrum 28.

A conventional static position actuator 30 provides a position input to the lever arm 24, by way of an actuator flexure 32. A pair of passive damping assemblies 34, connected to the lever arm 24, provide damping forces to the lever arm 24.

Individual details on the assembly 20 components are now provided, as a preliminary step to a disclosure of its operation.

The FIG. 2 optical element comprises a conventional secondary mirror 22. In other embodiments (not shown), the optical element may comprise a primary mirror, a petal of a segmented mirror, a conventional lens, or a diffraction grating.

The optical element 22 is connected to the lever arm 24 by way of the single conventional strut flexure 26. Although one strut flexure 26 is shown in FIG. 2, it is preferred to use six strut flexures, during an actual operation of the assembly, in order to position the secondary mirror 22 in six degrees of freedom. Preferred strut flexures comprise graphite/epoxy tubes.

The lever arm 24 has a spring stiffness as of at least 20,000 pounds/inch, but less than $2 \times 10^6$ pounds/inch. These stiffness limitations are imposed because, within this window, the lever arm 24 can both realize and maintain a required fixed position, yet be suitably resilient for accommodating vibratory perturbations to the assembly 20.

A preferred lever arm 24 comprises Invar, having an elastic modulus $E = 19 \times 10^6$ psi. Invar is preferred, not only because of its elastic modulus, but because of its low coefficient of thermal expansion. The lever arm 24 may also comprise, for example, steel, having an elastic modulus $E = 30 \times 10^6$ psi, or nylon, having an elastic modulus $E = 0.4 \times 10^6$ psi.

The conventional static position actuator 30 can provide a positional input to the lever arm 24, by way of the actuator flexure 32. A required positional input may be derived by way of a conventional positional sensor means, not shown. A suitable static position actuator 30 is available from Plessey Inc., model CU-09609191. The static position actuator 30 is typically a motor driven, lead-screw device. It may be assumed, for purposes of the present invention, that once the secondary mirror 22 is positioned by the operation of the static position actuator 30, that it remains so positioned, for all time, independent of extraneous perturbations to the optical system 20. To this end, the static position actuator 30 and lever arm 24 preferably cooperate to provide a reduction in motion (e.g., 8:1) between the static position actuator 30 and strut flexure 26. This action can result in improved positioning precision, and decreased loads on the static position actuator 30. Note that in typical applications, an assembly may use a plurality of such static position actuators 30.

The pair of passive damping assemblies 34 may each comprise a constraining layer 36, preferably having an elastic modulus of approximately $E = 10 \times 10^6$ psi, for example, a constraining layer 36 comprising conventional aluminum; and, an attached visco-elastic layer 38, preferably comprising a 3 M Corporation, product No. 4945. In particular, the constraining layer 36 comprising aluminum is preferably bonded to the visco-elastic layer 38, for example, by way of a conventional adhesive, while the visco-elastic layer 38, in turn, is preferably bonded to the lever arm 24, for example, also by way of a conventional adhesive.

Suitable dimensions for the constraining layer 36 may comprise an aluminum sheet having a length of 1.75 inch, a width of 1.0 inch, and a thickness of 0.062 inch; a suitable dimension for the visco-elastic layer 38 may comprise the 3 M composition having a length of 1.75 inch, a width of 1.0 inch, and a thickness of 0.045 inch.

A disclosure of a typical operation of the FIG. 2 assembly 20 is as follows. The static position actuator 30 provides a desired Positional input to the lever arm 24, by way of the actuator flexure 32. Subsequent and undesired perturbations to the secondary mirror 22 are typically transmitted to the lever arm 24 by way of the strut flexure 26. These perturbations induce a periodic elastic bending of the lever arm 24. This periodic bending, in turn, induces internal strain to the visco-elastic layer 38. This last action results in a conversion, internal to the visco-elastic layer 38, of undesired vibratory energy, into dissipative heat. Note that this conversion process is significantly enhanced by the constraining layer 36.

In this way, therefore, the lever arm 24 is at once a unique medium for realizing positional control of the secondary mirror 22, by way of its mediating role between the position actuator 30, and the strut flexure 26 connected to the secondary mirror 22; and, a medium for realizing dynamic damping of the secondary mirror 22, by way of its mediating role between the passive damping assemblies 34, and the strut flexure 26 connected to the secondary mirror 22.

We claim:

1. An assembly comprising:
    a) an optical element;
    b) a lever arm having a spring stiffness as seen by the optical element of at least 20 K pounds/inch, but less than 2 M pounds/inch;
    b) a flexure means having first and second ends, the first end being connected to the optical element;
    c) a dual functioning lever arm connected to the second end of the flexure means, for interdependently positioning and providing vibration control of the optical element, and comprising a spring stiffness of at least 20 K pounds/inch, but less than 2 M pounds/inch;
    d) a static position actuator for positioning the lever arm, thereby positioning the lever arm, thereby positioning the optical element by way of the flexure means; and
    e) a passive damping assembly for applying damping forces to the lever arm, thereby, by way of the flexure means, dampening perturbations to the optical element.

2. An assembly according to claim 1, wherein the optical element comprises a secondary mirror.

3. An assembly according to claim 1, wherein the lever arm comprises Invar.

4. An assembly according to claim 1, wherein the flexure means comprises at least one graphite/epoxy tube.

5. An assembly according to claim 1, wherein the passive damping assembly comprises a layer of visco-elastic material bonded to the lever arm.

6. An assembly according to claim 5, wherein the passive damping assembly further comprises a constraining layer bonded to the visco-elastic material.

* * * * *